(12) United States Patent
Stabrawa et al.

(10) Patent No.: US 8,307,154 B2
(45) Date of Patent: Nov. 6, 2012

(54) SYSTEM AND METHOD FOR PERFORMING RAPID DATA SNAPSHOTS

(75) Inventors: Timothy Allen Stabrawa, Wauwatosa, WI (US); Andrew S. Poling, Naperville, IL (US); John K. Overton, Chicago, IL (US)

(73) Assignee: Kove Corporation, Chicago, IL (US)

( * ) Notice: Subject to any disclaimer, the term of this patent is extended or adjusted under 35 U.S.C. 154(b) by 308 days.

(21) Appl. No.: 12/712,884

(22) Filed: Feb. 25, 2010

(65) Prior Publication Data
US 2010/0228919 A1    Sep. 9, 2010

Related U.S. Application Data

(60) Provisional application No. 61/156,964, filed on Mar. 3, 2009.

(51) Int. Cl.
*G06F 12/16* (2006.01)
(52) U.S. Cl. ......................... 711/113; 711/114; 711/162
(58) Field of Classification Search .................. 711/114, 711/161, 162
See application file for complete search history.

(56) References Cited

U.S. PATENT DOCUMENTS

| | | | |
|---|---|---|---|
| 6,163,856 A | 12/2000 | Dion et al. | 714/4 |
| 6,199,178 B1 | 3/2001 | Schneider et al. | 714/21 |
| 6,996,587 B2 | 2/2006 | Wagener et al. | 707/204 |
| 7,246,140 B2 | 7/2007 | Therrien et al. | 707/202 |
| 7,424,592 B1 | 9/2008 | Karr et al. | 711/203 |
| 7,454,583 B2 * | 11/2008 | Yagisawa et al. | 711/162 |
| 7,865,627 B2 * | 1/2011 | Kaushik et al. | 710/5 |
| 2002/0004890 A1 * | 1/2002 | Ofek et al. | 711/161 |
| 2003/0061399 A1 | 3/2003 | Wagener et al. | 709/321 |
| 2003/0070043 A1 | 4/2003 | Merkey | 711/114 |
| 2006/0010227 A1 | 1/2006 | Atluri | 709/217 |
| 2006/0047931 A1 | 3/2006 | Saika | 711/162 |
| 2007/0162716 A1 * | 7/2007 | Yagisawa et al. | 711/162 |
| 2009/0119449 A1 | 5/2009 | Nagaram Chengal | 711/103 |
| 2009/0193195 A1 * | 7/2009 | Cochran et al. | 711/133 |
| 2009/0307449 A1 | 12/2009 | Prahlad et al. | 711/162 |

OTHER PUBLICATIONS

RAM disk, downloaded Jan. 12, 2010, pp. 1-3, Wikipedia, available at http://en.wikipedia.org.

* cited by examiner

*Primary Examiner* — John Lane
(74) *Attorney, Agent, or Firm* — Brinks Hofer Gilson & Lione

(57) ABSTRACT

A storage system is provided that includes storage controller logic that performs rapid data snapshots. The storage controller logic may provide block-level access to a storage volume. The storage controller logic may store all data blocks of the storage volume in a first solid state memory cache. The storage controller logic may form a snapshot of the storage volume in a second solid state memory cache. The first and second solid state memory caches are addressable with a processor. The storage system may complete the snapshot extremely quickly because the processor may copy from one memory location to another between the first and second solid state memory caches.

21 Claims, 5 Drawing Sheets

SYSTEM AND METHOD FOR PERFORMING RAPID DATA SNAPSHOTS

This application claims priority under 35 U.S.C. §119(e) to U.S. Provisional Application No. 61/156,964, entitled "SYSTEM AND METHOD FOR PERFORMING RAPID DATA SNAPSHOTS," filed Mar. 3, 2009, the entire contents of which are hereby incorporated herein by reference.

BACKGROUND OF THE INVENTION

1. Technical Field

This application relates to data storage and, in particular, to preparing snapshots of data.

2. Related Art

Point-in-time snapshots of data stored in storage systems may be needed for various reasons, such as guaranteeing data integrity and recovering from data loss. The snapshots may be initiated by a human, by a software application, or both. Traditional approaches for performing snapshots commonly use multiple machines connected through a storage network. A host machine serves host data and a remote machine serves a snapshot of the host data. The snapshot is created by copying the host data over the storage network from the host machine to the remote machine.

In traditional approaches, a software application ceases write activity, flushes memory contents onto disk, and then transfers an image of the host data from the host storage machine to the remote machine. This image of the host data provides a time-specific snapshot for archival or disaster recovery purposes.

However, traditional approaches may become cumbersome to end-users of software applications that use the storage media being duplicated. For example, performing a snapshot may slow or halt applications during the snapshot process. Also, the performance of the software applications may be slow enough that the software applications fail to meet desired service levels. Moreover, traditional approaches may require bringing applications off-line for extended periods, resulting in service delays for any service hosted on a snapshot source storage medium. Additionally, traditional approaches may move data relatively slowly across the storage network from one storage device to another. Creating the snapshot may require a considerable amount of time, during which the software applications may not be able to write or read data without significant delay. Even when employing traditional snapshot methods that are considered relatively fast, creating the snapshot may still degrade storage performance enough to cause noticeable application delays. The larger the data, the more time the transfer of data across the storage network may take. Also, the larger the data, the longer applications may delay processing when a storage system suspends writes in order to guarantee snapshot data integrity. Therefore, there exists a need for snapshots operating at the fastest possible speeds.

SUMMARY

A system is provided that includes storage controller logic that performs rapid data snapshots. The storage controller logic provides block-level access to at least one storage volume. The storage controller logic may store all data blocks of the at least one storage volume in a first solid state memory cache. The storage controller logic may form at least one snapshot of the at least one storage volume, where all data blocks of the at least one snapshot are stored in a second solid state memory cache. The first and second solid state memory caches may be addressable with the processor in a common address space.

A computer readable medium may also be provided that includes instructions executable to provide block-level access to a storage volume. The instructions may provide the storage volume in a first memory cache that includes all data stored in the storage volume. The instructions may form a snapshot of the storage volume in a second memory cache. The second memory cache may include all data stored in the snapshot of the storage volume. The snapshot may be formed copying data between the first and second memory caches.

A method may be provided that forms a snapshot volume from a storage volume. The storage volume may be stored in a first memory cache, where the first memory cache may include all data blocks of the storage volume. At least a portion of the data blocks of the storage volume may be copied from the first memory cache to a second memory cache with the processor. The second memory cache may include all data blocks of the snapshot volume. The first and second memory caches may be included in a solid state memory that is addressable with the processor.

Further objects and advantages of the present invention will be apparent from the following description, reference being made to the accompanying drawings wherein preferred embodiments of the present invention are shown.

BRIEF DESCRIPTION OF THE DRAWINGS

The innovation may be better understood with reference to the following drawings and description. The components in the figures are not necessarily to scale, emphasis instead being placed upon illustrating the principles of the invention. Moreover, in the figures, like-referenced numerals designate corresponding parts throughout the different views.

DETAILED DESCRIPTION

By way of example, a system for performing rapid snapshots may store all of the data of a storage volume in a first memory cache. The system may rapidly perform a snapshot by copying all or a portion of the data of the storage volume from the first memory cache to a second memory cache, where the first and second memory caches share a common address space in solid state memory, such as RAM (Random Access Memory). All of the data of a snapshot volume is included in the second memory cache. The system may optionally copy the data of the snapshot volume to a backing store, such as flash memory or a magnetic disk. The system may also optionally copy the data of the storage volume to the same backing store, a different backing store, or both. A block device storage controller may perform the snapshots and control access to the storage and snapshot volumes.

One technical advantage of the systems and methods for performing rapid snapshots is that snapshots may be completed extremely quickly. For example, a snapshot may be completed in the time it takes the processor to copy the data from the first memory cache to the second memory cache. Because the processor is copying data from one memory location to another, the processor may copy the data at an extremely high data transfer rate. For example, the data transfer rate may exceed hundreds of gigabytes per second using memory available today. In contrast, when a processor copies data from one block storage device to another using a suitable block storage device interface, such as SCSI (Small Computer System Interface), the data transfer rate may be on the order of hundreds of megabytes per second. This is true even if the suitable block storage device is a solid state mass storage device. Another technical advantage of the systems and methods for performing rapid snapshots is that there may be few, if any, compatibility issues with existing software applications because the block device storage controller may implement the snapshot functionality transparently to the software applications storing data in the storage volume. Thus, snapshots of mission critical application data may be made with no or minimal impact on service level.

Figure 1:
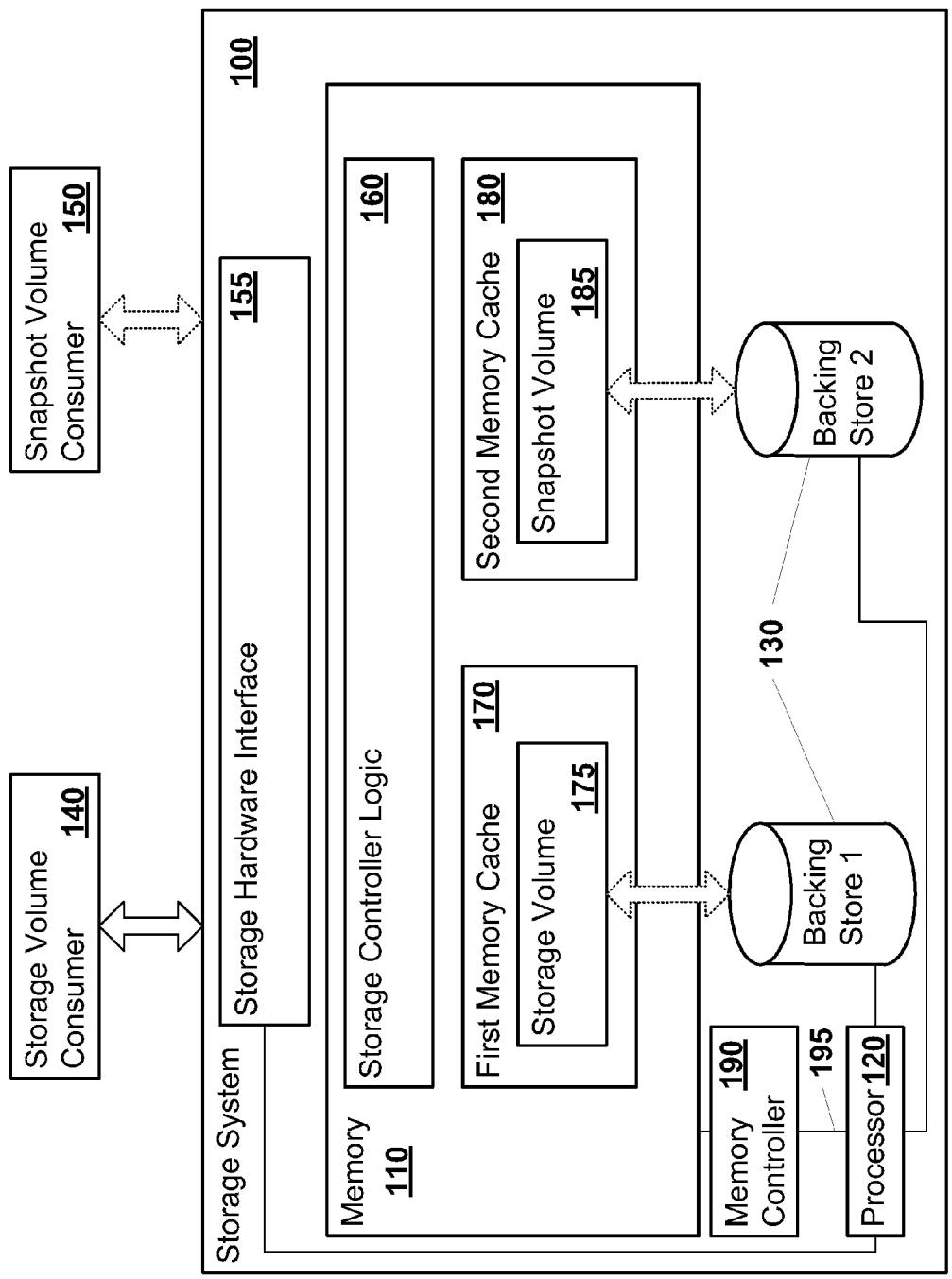
FIG. 1 illustrates an example hardware diagram of a storage system that performs rapid snapshots.

FIG. 1 illustrates an example hardware diagram of a storage system 100 that performs rapid snapshots. The storage system 100 may include a memory 110 and a processor 120. The system 100 may include more, fewer, or different elements. For example, the storage system 100 may also include one or more backing stores 130. In one example, the storage system 100 may include a storage volume consumer 140 and a snapshot volume consumer 150. In a second example, the storage volume consumer 140 and the snapshot volume consumer 150 may not be part of the storage system 100. Alternatively or in addition, the storage system 100 may include a storage hardware interface 155 that is explained in more detail below.

The memory 110 may be any memory, such as a solid state memory, a random access memory (RAM), a dynamic random access memory (DRAM), a static random access memory (SRAM), a flash memory, a read-only memory (ROM), an electrically erasable programmable read-only memory (EEPROM), any type of memory configured in an address space addressable by the processor 120, or any combination thereof. The memory 110 may be volatile or non-volatile, or a combination of both.

The memory 110 may include a storage controller logic 160, a first memory cache 170 for storage of a storage volume 175, and a second memory cache 180 for storage of a snapshot volume 185. In one implementation, the portion of the memory 110 that includes the storage controller logic 160 is of a different type than the portion of the memory 110 that includes the first and second memory caches, 170 and 180. For example, the memory may include a ROM and a solid state memory, where the storage controller logic 160 is stored in ROM, and the solid state memory includes the first and second memory caches, 170 and 180. The first memory cache and second memory cache may be two overlapping or non-overlapping regions of a single memory cache or a collection of memory caches.

The processor 120 may be in communication with the memory 110. The processor 120 may also be in communication with additional components, such as the backing stores 130 and the storage hardware interface 155. The processor 120 may be a general processor, a central processing unit, a server, an application specific integrated circuit (ASIC), a digital signal processor, a field programmable gate array (FPGA), a digital circuit, an analog circuit, or any combination thereof. The processor 120 may be one or more devices operable to execute computer executable instructions or computer code embodied in the memory 120 or in other memory to perform snapshots. For example, the processor 120 may execute computer executable instructions that are included in the storage controller logic 160.

In one example, the storage system 100 may be included as part of a computer. For example, the processor 120 may be the central processing unit (CPU) of the computer, the memory 110 may be the computer's memory, and the computer includes the storage hardware interface 155.

In a second example, the storage system 100 may be added to a computer or some other type of device that accesses data in the storage system 100. For example, the storage system 100 may be a device installed in a computer, where the storage volume consumer 140 and/or the snapshot volume consumer 150 is a process executed by a central processing unit (CPU) of the computer that is in communication with the storage controller logic 160 over the storage hardware interface 155. The storage hardware interface 155 may be, for example, a SCSI or SATA (serial AT attachment) interconnect. The memory 110 in the storage system 100 may be different than the memory accessed by the CPU of the computer, and the processor 120 may be different than the CPU of the computer. In a third example, the storage volume consumer 140 and/or the snapshot volume consumer 150 may communicate with the storage system 100 over a network or switched fabric, such as a Storage Area Network (SAN), an INFINIBAND™ network, which is a registered trademark owned by System I/O Inc. of Beaverton Oreg., a Local Area Network (LAN), a Wireless Local Area Network (WLAN), a Personal Area Network (PAN), a Wide Area Network (WAN), or any other now known or later developed communications network.

In any configuration, the first and second memory caches, 170 and 180, are included in solid state memory. Solid state memory may be a device, or combination of devices, that stores data, is constructed primarily from electrical conductors, semiconductors and insulators, and is generally considered not to have any moving mechanical parts. Solid state memory may be byte-addressable, word-addressable or block-addressable. For example, most dynamic RAM and some flash RAM may be byte-addressable or word-addressable. Flash RAM and other persistent types of RAM may be block-addressable. Solid state memory may be designed to connect to a memory controller 190 via a data bus internal to a computing device. The computing device may be any device that includes a processor, such as the processor 120 in the storage system 100, a CPU or a DMA (direct memory access) controller.

The memory controller 190 is a hardware component that translates memory addresses specified by the processor into the appropriate electrical signaling to access corresponding locations in the solid state memory. The processor, such as the processor 120 in the storage system 100, may specify the address on a system bus 195. The system bus 195 may be a bus that electrically couples the processor 120 to the memory 110, where the processor 120, the system bus 195, and the memory 110 are directly or indirectly coupled to a common circuit board, such as a motherboard. In one example, the system bus 195 may include an address bus that is used to specify a physical address, where the address bus is a series of lines connecting two or more components. The memory controller 190 may include software. The memory controller 190 may, for example, also perform background processing tasks, such as periodically refreshing the contents of the memory. In one example implementation, the memory controller 190 may be included in the processor 120. Thus, solid state memory may be random access memory that permits stored data to be read and/or written in any order (i.e., at random). The term "random" refers to the fact that any piece of data may be returned and/or written within a constant time period, regardless of the physical location of the data and regardless of whether the data is related to a previously read or written piece of data. In contrast, storage devices such as magnetic or optical discs rely on the physical movement of the recording medium or a read/write head so that retrieval time varies based on the physical location of the next item read and write time varies based on the physical location of the next item written. Examples of solid state memory include, but are not limited to: DRAM, SRAM, NAND flash RAM, NOR flash RAM, Phase Change Memory (PRAM), EEPROM, FeRAM, MRAM, CBRAM, PRAM, SONOS, RRAM, Racetrack memory, NRAM, Millipede, T-RAM, Z-Ram, and TTRAM.

In contrast to solid state memory, solid state storage devices are systems or devices that package solid state memory with a specialized storage controller through which the packaged solid state memory may be accessed using a hardware interconnect that conforms to a standardized storage hardware interface. For example, solid state storage devices include, but are not limited to: flash memory drives that include SATA or SCSI interfaces, Flash or DRAM drives that include SCSI over Fibre Channel interfaces, DRAM drives that include SATA or SCSI interfaces, and USB (universal serial bus) flash drives with USB interfaces.

The storage controller logic 160 of the storage system 100 provides the storage volume consumer 140 with block-level access to the storage volume 175. Alternatively or in addition, the storage controller logic 160 may provide the snapshot volume consumer 150 with block-level access to the snapshot volume 185. The storage controller logic 160 may perform one or more snapshots of the storage volume 175. Alternatively or in addition, the storage controller logic 160 may restore the storage volume 175 from a particular point-in-time snapshot or from a range-of-time snapshot.

The storage controller logic 160 may provide the block-level access using any storage protocol now known or later discovered. A storage protocol may be any communications protocol used to transfer data between a block storage device or system and a device or system that stores the data in, and/or retrieves the data from, the block storage device or system. A storage protocol may be implemented, for example, using one or more hardware storage controllers. The storage protocol and electrical characteristics of the hardware storage controller may be part of a common standard. In one example, the storage protocol may be the universal serial bus mass storage device class (USB MSC or UMS), which is a set of computing communications protocols defined by the USB Implementers Forum that runs on a hardware bus conforming to the USB standard. In a second example, the storage protocol may be the SCSI command protocol. In a third example, the storage protocol may be the SATA protocol. Additional examples of the storage protocol include Serial Attached SCSI (SAS) and Internet Small Computer System Interface (iSCSI). Alternatively or in addition, the storage controller logic 160 may provide the block-level access using any storage protocol that is transferred using any data transfer protocol, such as SCSI over Fibre Channel, SCSI RDMA Protocol (SRP) over Remote Direct Memory Access (RDMA), iSCSI over TCP/IP, or any other combination of storage protocol and data transfer protocol known now or discovered in the future.

By providing block-level access through the storage controller logic 160, the storage system 100 may be considered, in at least one example implementation, a block storage device. A block storage device may also be referred to as a block device. A block device stores data in blocks of a predetermined size, such as 512 or 1024 bytes. The predetermined size may be configurable. A block device is accessed via a software or hardware storage controller. Examples of other block devices include a disk drive having a spinning disk, a tape drive, a floppy disk drive, and a USB flash pen drive.

The storage controller logic 160 may include computer code. The computer code may include instructions executable with the processor 120. The computer code may be written in any computer language now known or later discovered, such as C, C++, C#, Java, or any combination thereof. In one example, the computer code may be firmware. Alternatively or in addition, the storage controller logic 160 and the processor 120 may be implemented as a circuit. For example, the circuit may include a FPGA configured to perform the functions of the storage controller logic 160. Alternatively, or in addition, the circuit may include an ASIC configured to perform the functions of the storage controller logic 160.

As explained above, in at least one example, the storage controller logic 160 may provide the block-level access over the storage hardware interface 155. The storage hardware interface 155 may be any physical interconnect used for data transfer. Examples of the storage hardware interface 155 include, but are not limited to: Fibre Channel, INFINIBAND™, SATA, SCSI, USB, Ethernet or any other physical communications interface.

The storage controller logic 160 may create one or more volumes, such as the storage volume 175 and the snapshot volume 185. A volume is a configured area of storage that is accessible at the block level via any storage protocol now known or later discovered. Storage protocols are described above.

In one example, the volume may be a physical volume, which maps a sequence of data blocks to corresponding memory locations in the memory 110. Therefore, in addition to the data blocks themselves, the volume may include volume information, such as a mapping of data blocks to memory locations. The data blocks of the volume, which are configured by the storage controller logic 160, are all stored in a memory cache that is included in the memory 110. For example, the data blocks of the storage volume 175 may be stored in the first memory cache 170 and the data blocks of the snapshot volume 185 may be stored in the second memory cache 180. The volume information may or may not be included in the memory cache. Accordingly, when the volume is said to be included in the memory cache, at least the data blocks of the volume (the data stored in the volume) are included in the memory cache.

The one or more backing stores 130 may include any block device. Examples of the backing stores 130 include, but are not limited to, hard disks, CD-ROM drives, tape drives, flash drives, or any other mass storage device.

The storage volume consumer 140 may be any process executed by a processor, any device, any component, or any combination thereof, that is in communication with the storage controller logic 160 to access or manipulate the storage volume 175. The snapshot volume consumer 150 may be any process executed by a processor, any device, or any combination thereof, that is in communication with the storage controller logic 160 to access or manipulate the snapshot volume 185. Examples of the storage volume consumer 140 and the snapshot volume consumer 150 include a file system component of an operating system, an application executing in an operating system, a service running on a computer, a computer, a server, a laptop, or any device configured to communicate with the storage hardware interface 155.

During operation of the storage system 100, the storage controller logic 160 may initiate a snapshot of the storage volume 175. The storage controller logic 160 may create the snapshot of the storage volume 175 using any one or more algorithms described below. The algorithms may differ from each other balancing tradeoffs between aggregate performance, speed of operations, application impact, and user impact, among others. Alternately or in addition, a snapshot algorithm not described below may be used to create the snapshot of the storage volume 175 in the second memory cache 180.

The storage controller logic 160 may initiate the snapshot in response to a determination that a preconfigured condition is met, such as a determination that a configured amount of time has elapsed since the last snapshot of the storage volume 175 was initiated. Alternatively or in addition, the snapshot may be initiated in response to a snapshot request received from the storage volume consumer 140 and/or the snapshot volume consumer 150. For example, a backup application executing in an operating system may request that the storage controller logic 160 initiate the snapshot. That request may be received by the storage controller logic 160 when the backup application invokes a programmatic function included in an application programming interface (API) implemented by the storage controller logic 160. Alternatively or in addition, the storage controller logic 160 may initiate the snapshot in response to receiving a request to initiate the snapshot over the storage hardware interface 155.

In creating the snapshot, the processor 120 may directly access the memory 110 in order to copy data blocks from the first memory cache 170 to the second memory cache 180. The memory 110 is said to be addressable by the processor 120 if the processor is electrically coupled to the memory 110 via at least one memory bus. Alternatively or in addition, the memory 110 is said to be addressable by the processor 120 if the memory 110 is assigned a range of memory in a system memory address space and is accessed by the processor 120 via the memory controller 190 that converts addresses specified by the processor 120 into suitable electrical signals communicated between the memory controller 190 and the memory 110. Alternatively or in addition, the memory 110 is said to be addressable by the processor 120 if the memory 110 is electrically coupled to the system bus 195. Alternatively or in addition, the memory 110 is said to be addressable by the processor 120 if the memory 110 is electrically coupled to the memory controller 190, and the memory controller 190 is in turn electrically coupled to the system bus 195. Alternatively or in addition, the memory 110 is said to be addressable by the processor 120 if the processor 120 may access the memory by specifying the address on the system bus 195 for a particular memory location and reading a byte or a word from the particular memory location.

In one implementation, the storage system 100 may be implemented using a Non-Uniform Memory Architecture (NUMA). In NUMA, the processor 120 may comprise multiple processor cores connected together via a switched fabric of point-to-point links. The memory controller 190 may include multiple memory controllers. Each one of the memory controllers may be electrically coupled to a corresponding one of the processor cores. Each one of the multiple memory controllers may service a different portion of the memory 110.

In a second implementation, multiple processors may be electrically coupled to the system bus 195. Additional components may be electrically coupled to the system bus 195, each respective one of multiple memories that are included in the memory 110, the storage hardware interface 155, one or more of the backing stores 130, and one or more memory controllers, such as the memory controller 190 in FIG. 1.

The storage controller logic 160 may subdivide the memory 110 into one or more volumes. The storage controller logic 160 may configure each of the volumes as either a user volume or a snapshot, such as the storage volume 175 and the snapshot volume 185, respectively. A user volume may be accessible by an external process or device, such as the storage volume consumer 140. In one example, the snapshot volume 185 may be configured to be accessible by an external process or device. In a second example, the snapshot volume 185 may not be accessible by an external process or device.

The memory 110 may be considered a large cache that is at least as large as the storage volume 175 to be copied. The memory 110 may be used during operation of the storage system 100 to provide high speed, low latency access to data stored in the storage volume 175. When a snapshot is requested, the storage controller logic 160 may use the memory 110 to drastically speed up data duplication.

The storage volume 175 and/or the snapshot volume 185 may be copied to one or more of the backing stores 130. The backing stores 130 may be slower, and therefore lower cost, storage than the memory 110. Copying any of the volumes to a slower, lower cost medium may include the storage controller logic 160 directly transferring data in the memory 110 to one or more of the backing stores 130. Alternatively or in addition, copying any of the volumes to the backing stores 130 may include the storage volume consumer 140 and/or snapshot volume consumer 150, such as a traditional backup process, performing the copy. Alternatively or in addition, the storage volume consumer 140 and/or snapshot volume consumer 150 may include a file system. The file system, in response to an action taken by a human user, may copy from the storage volume 175 and/or the snapshot volume 185 to one or more of the backing stores 130. In one example, the block-level access to the snapshot volume 185 may be made available prior to any data being copied to the snapshot volume 185. Furthermore, although the snapshot volume 185 may be a block storage area stored in the second memory cache 180, these techniques still apply if the snapshot volume 185 is simply an allocated set of memory pages, with no particular format, or in any format not described here. Additionally or alternatively, any of the volumes may be accessible from a SAN (storage area network), and may be copied from the storage area network.

1. Full Copy Example

Figure 2:
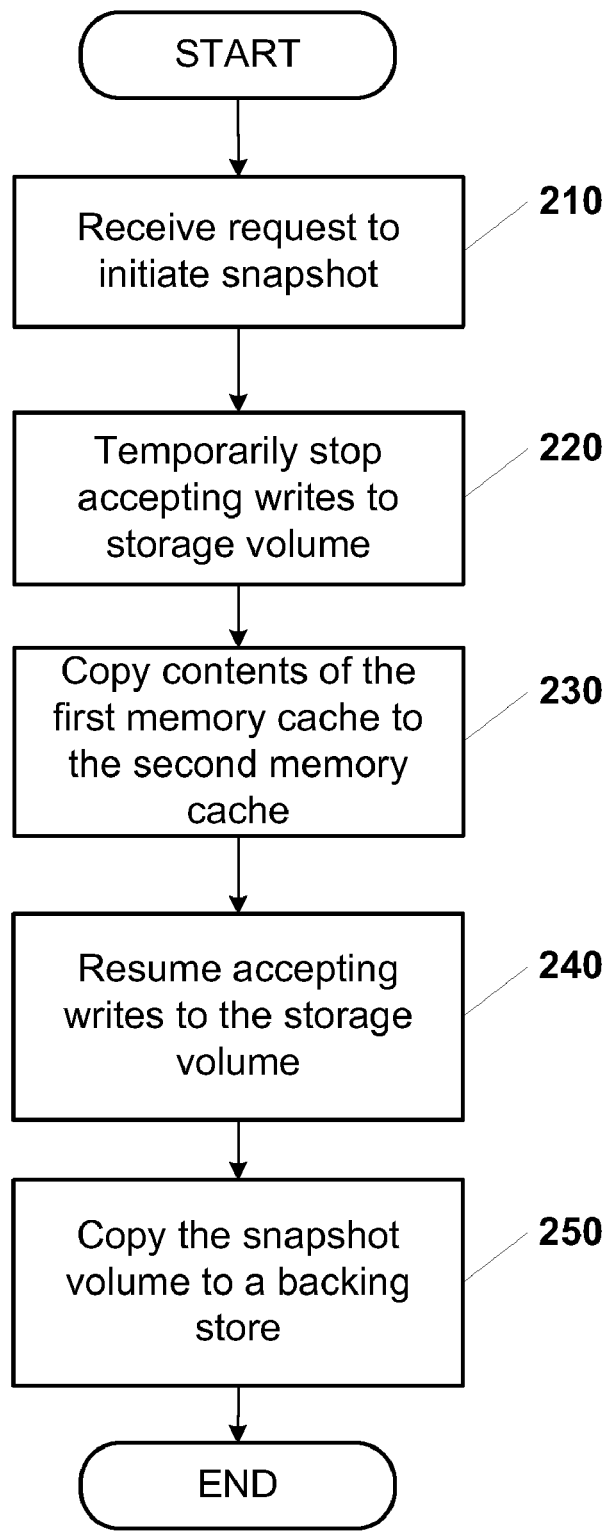
FIG. 2 illustrates a first example flow diagram of the logic of the storage system to form a snapshot using a full copy.

FIG. 2 illustrates a first example flow diagram of the logic of the storage system 100 to form a snapshot using a full copy. The logic may include additional, different, or fewer operations. The operations may be executed in a different order than illustrated in FIG. 2.

In the full copy example, the storage controller logic 160 stops accepting writes to the storage volume 175 while the storage controller logic 160 copies all of the data blocks of the storage volume 175 from the first memory cache 170 to the second memory cache 180. Prior to forming the snapshot, the memory 110 may include at least twice as much memory as is actively used for storage of the storage volume 175. In other words, less than half of the memory 110 is used to hold the storage volume 175 so that enough of the memory 110 will be available to store the snapshot volume 185. When not forming a snapshot, the storage controller logic 160 may handle read and write requests by reading from and writing to the first memory cache allocated to the storage volume 175.

The operation may begin by the storage controller logic 160 receiving a request to initiate a snapshot (210). The storage controller logic 160 may temporarily stop accepting writes to the storage volume 175 (220). In a first example, the storage controller logic 160 may reject any request to write one or more blocks to the storage volume 175. In a second example, the storage controller logic 160 may delay servicing any request to write one or more blocks to the storage volume 175 until after the snapshot is complete.

The storage controller logic 160 may copy the contents of the first memory cache 170 to the second memory cache 180 (230). After the contents of the first memory cache 170 are copied to the second memory cache 180, the snapshot is complete and the storage system 100 may resume accepting writes to the storage volume 175 (240). The snapshot volume 185 may be copied to one or more of the backing stores 130. In a different example, the snapshot volume 185 is not copied to any backing store (250).

2. Continuous Copy Example

Figure 3C:
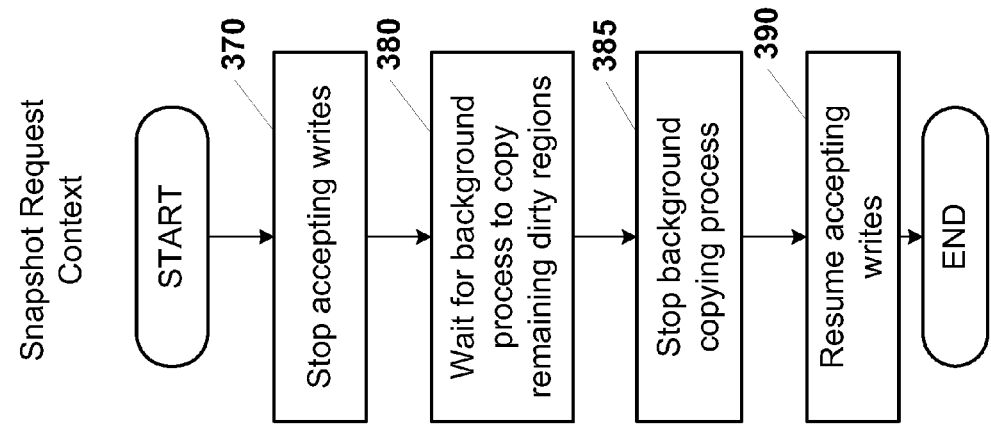
FIG. 3C illustrates the continuous copy example flow diagram of the logic of the storage system from a snapshot request context.
Figure 3B:
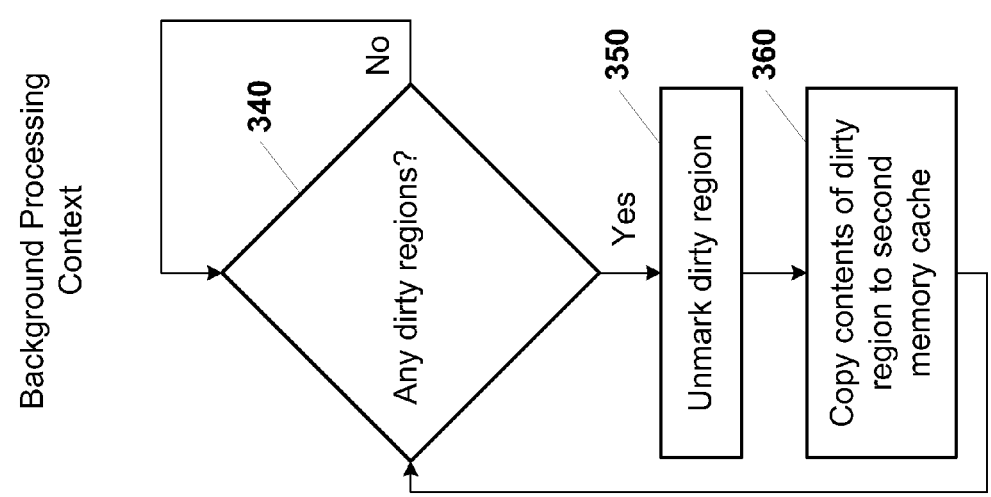
FIG. 3B illustrates the continuous copy example flow diagram of the logic of the storage system from a background processing context.
Figure 3A:
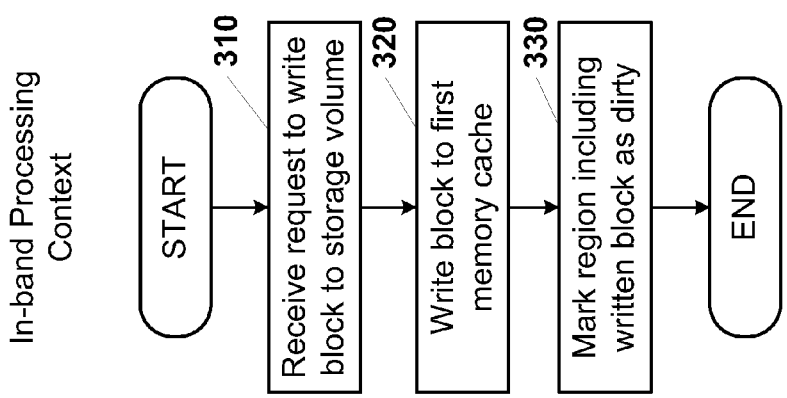
FIG. 3A illustrates a continuous copy example flow diagram of the logic of the storage system from an in-band processing context.

FIGS. 3A-3C, in combination, illustrate a second example flow diagram of the logic of the storage system 100 to form a snapshot using a continuous copy. Each of the FIGS. 3A-3C illustrates the logic of one of three contexts: an in-band processing context, a background processing context, and a snapshot request context.

In the continuous copy example, the storage controller logic 160 maintains a full copy of the storage volume 175 in the snapshot volume 185 by storing any blocks written to the storage volume 175 both in the first memory cache 170 and in the second memory cache 180 instead of just in the first memory cache 170. When a snapshot is subsequently requested, the storage controller logic 160 ceases to accept any more writes until any previous writes not yet written to the second memory cache 180 have been written. In the continuous copy example, the storage volume 175 occupies no more than half of the memory 110, and an equal amount of the memory 110 is reserved for the snapshot volume 185.

FIG. 3A illustrates the continuous copy example flow diagram of the logic of the storage system 100 from the in-band processing context. The logic may include additional, different, or fewer operations. The operations may be executed in a different order than illustrated in FIG. 3A.

As write requests are received during normal operation, the storage controller logic 160 processes the requests in-band. For example, the operation may begin by the storage controller logic 160 receiving a request to write one or more blocks to the storage volume 175 (310). The storage controller logic 160 may write the block to the first memory cache 170 (320). The storage controller logic 160 may then mark a region of the first memory cache 170 as dirty using a dirty flag (330). The region is referred to as "dirty" if a data block within the region has been updated through a write, but the updated data block has not yet been written to the second memory cache 180. The dirty region may identify dirty blocks.

The in-band processing of the write request may end, for example, by the storage controller logic 160 indicating to the storage volume consumer 150 that the write was successful. Subsequent writes may be similarly handled in-band. The writes are handled in-band so that the storage volume consumer 140 may wait as little as possible to learn that the write was complete. The write may be considered complete because the write was written to the first memory cache 170.

FIG. 3B illustrates the continuous copy example flow diagram of the logic of the storage system 100 from the background processing context. The storage controller logic 160 may initiate a background process to propagate the writes from the first memory cache 170 to the second memory cache 180. In a first example, the storage controller logic 60 may initiate the background process in response to receiving one of writes. In a second example, the storage controller logic 60 may initiate the background process when the storage volume 175 is created.

The background process may check whether any of the regions of the first memory cache 170 are dirty (340). If not, then the background process may keep checking whether any of the regions of the first memory cache 170 are dirty (340). However, if any region of the first memory cache 170 is dirty, then the contents of the dirty region of the first memory cache 170 should be copied to a corresponding region of the second memory cache 180. The corresponding region of the second memory cache 180 holds the corresponding data blocks of the snapshot volume 185. The storage controller logic 160 may clear the dirty flag (350) to indicate that the corresponding region of the second memory cache 180 is updated. Then the storage controller logic 160 may copy the contents of the dirty region of the first memory cache 170 to a corresponding region of the second memory cache 180 (360). The operation may continue by the background process checking whether any of the regions of the first memory cache 170 are dirty (340).

The order in which dirty flags are updated in the in-band and background processing contexts may matter to the data integrity of the snapshot volume 185. In one example, when processing write requests in-band, the storage controller logic 160 may not overwrite data being copied to the snapshot volume 180 by the background process. Alternatively or in addition, if data is overwritten in data blocks being copied to the snapshot volume 180, the storage controller logic 160 may mark the region containing the overwritten data as dirty so that the data will eventually be processed by the background process and copied again to the snapshot volume 180.

One example algorithm to track dirty regions of the storage volume 175 is to use one or more adjustable region descriptors. An adjustable region descriptor identifies one or more ranges of data blocks, where the ranges of data blocks may be modified. For example, the adjustable region descriptors may include a starting memory address and an ending memory address. Alternatively or in addition, the adjustable region descriptors may include a starting address and a length or size of the adjustable region. When a data block is written to a memory location adjacent to an adjustable region descriptor, the storage controller logic 160 may adjust the region descriptor to include the block. An adjusted region descriptor is the adjustable region descriptor that has been adjusted. In one example, instead of clearing the dirty flag (360) to indicate that the contents of the region have been copied to the second memory cache 180, the storage controller logic 160 disposes of the region descriptors for the copied data.

FIG. 3C illustrates the continuous copy example flow diagram of the logic of the storage system 100 from the snapshot request context. When a snapshot is requested and/or initiated, the operation from the snapshot request context may start by the storage controller logic 160 temporarily stopping the in-band processing of write requests from accepting new write requests for the storage volume 175 (370). In particular, in-band processing by the storage controller logic 160 may be forced to stop accepting new writes until the background process finishes copying data from dirty regions in the first memory cache 170 to the second memory cache 180 (380). For example, the snapshot request operation may communicate with the in-band processing context using inter-process and/or inter-thread communication techniques. The snapshot request operation may communicate with the background process to determine whether any dirty regions remain to be copied. With no more writes being accepted and no dirty regions remaining to be copied, the snapshot volume 185 matches the storage volume 175. In general, the in-band processing of writes will be delayed for an extremely short period of time.

The operation may proceed by the storage controller logic 160 temporarily stopping the background process from copying dirty regions in the first memory cache 170 to the second memory cache 180 (385). The reason is that new writes may be accepted if the second memory cache 180 is not updated by the background process. Consequently, the storage controller logic 160 may resume accepting write requests for the storage volume 175 (390) after the background process is prevented from propagating the new writes to the second memory cache 180. The operation may complete, by for example, by copying the contents of the snapshot volume 185 to one or more backing stores 130.

When ceasing to accept writes (370) in the in-band processing context, the storage controller logic 160 may reject write requests with a busy status. Alternatively or in addition, when ceasing to accept writes (370), the storage controller logic 160 may delay execution of the writes. The storage controller logic 160 may complete the execution of the delayed writes after all dirty regions in the first memory cache 170 are copied to the second memory cache 180 and the background process is stopped from copying dirty regions to the second memory cache 180.

The data on the snapshot volume 185 may only be needed for a limited period of time. For example, after a determined period of time, a new snapshot is to replace the data in the snapshot volume 185. In another example, the data on the snapshot volume 185 may not be needed after being copied to one or more backing stores 130. Once the data on the snapshot volume 185 is no longer needed, the storage system 100 may resume normal operation of the background process.

3. Pre-Copy Example

Figure 4:
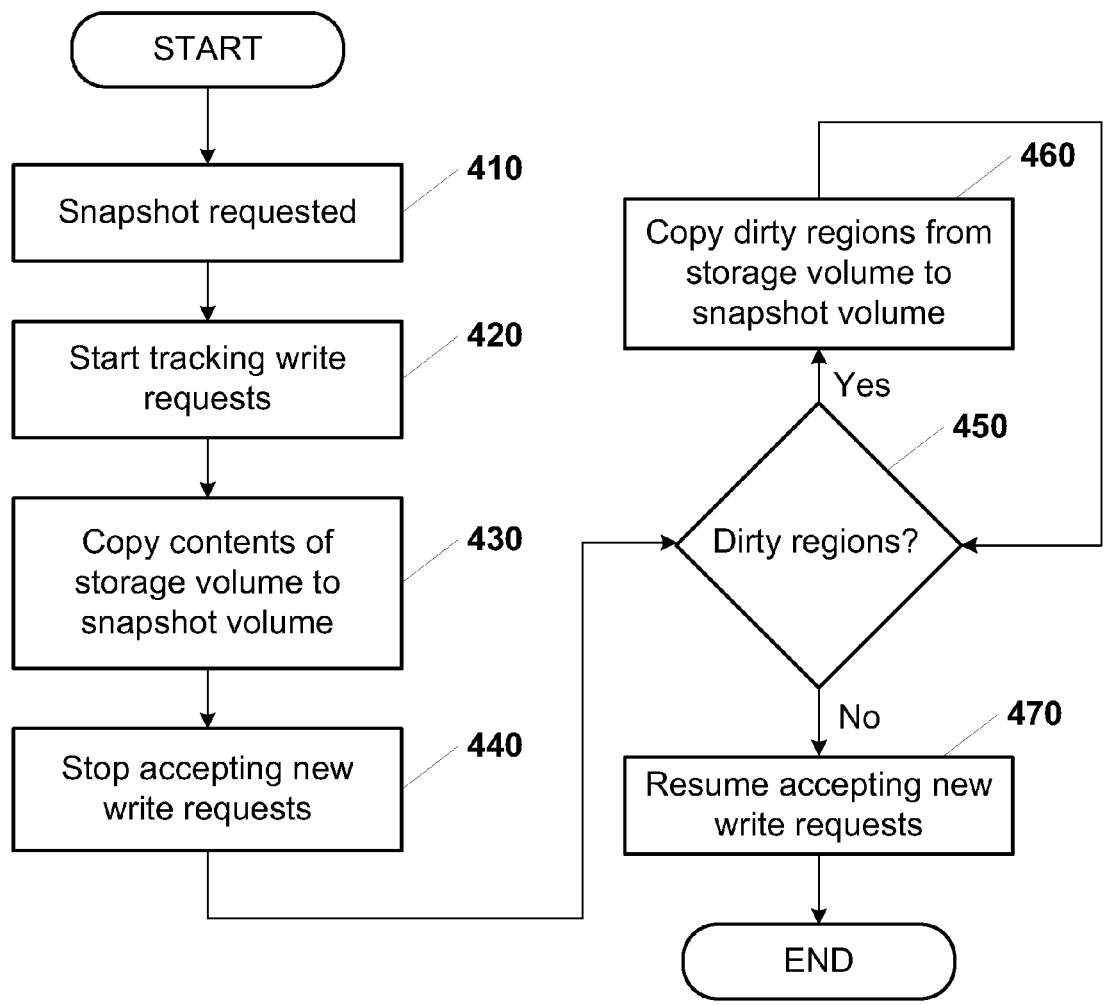
FIG. 4 illustrates a third example flow diagram of the logic of the storage system to form a snapshot using a pre-copy.

FIG. 4 illustrates a third example flow diagram of the logic of the storage system 100 to form a snapshot using a pre-copy. The logic may include additional, different, or fewer operations. The operations may be executed in a different order than illustrated in FIG. 4.

In the pre-copy example, the storage system 100 copies the entire storage volume 175 in response to a snapshot request, but permits and tracks writes made while entire the storage volume 175 is copied. In the pre-copy example, the storage volume 175 occupies no more than half of the memory 110, and an equal amount of the memory 110 is reserved for the snapshot volume 185.

The operation may begin by the storage controller logic 160 initiating a snapshot of the storage volume 175 (410) in response to a request. The storage controller logic 160 may start tracking write requests to the storage volume 175 in order to track what data changes in the storage volume 175 as a result of a write request received by the storage controller logic 160 (420). For example, the storage controller logic 160 may use dirty flags, adjustable region descriptors, or any other suitable method for tracking changes to the first memory cache 170.

While tracking any write requests (420), the storage controller logic 160 may copy all of the data blocks in the storage volume 175 to the snapshot volume 185 (430). For example, the storage controller logic 160 may copy the contents of the first memory cache 170 to the second memory cache 180. At this point, the contents of the first memory cache 170 may not match the second memory cache 180 if the storage controller logic updated the first memory cache 170 in response to write request during the copying of all of the data blocks in the first memory cache 170.

In one example, the operation may optionally include, after copying all of the data blocks (430), the storage controller logic 160 indicating to the storage volume consumer 140 that a snapshot is prepared. The storage controller logic 160 may then wait for the storage volume consumer 140 to indicate whether to proceed or abort the snapshot. If the storage volume consumer 140 indicates the snapshot is to abort, the operation may end, for example, by ceasing to track write requests to the storage volume 175. If the storage volume consumer 140 indicates the snapshot is to proceed, the operation may continue as described below. Alternatively or in addition, the storage controller logic 160 may optionally communicate with the snapshot volume consumer 150 instead of the storage volume consumer 140 in order to determine whether the snapshot is to proceed.

Alternatively or in addition, the storage controller logic 160 may optionally communicate to the storage volume consumer 140 or the snapshot volume consumer 150 what portion of the volume has been written to during the pre-copy operation. The larger the portion of the volume that has been written to during the pre-copy operation, the longer the snapshot will take to complete. Accordingly, the storage volume consumer 140 or the snapshot volume consumer 150 may determine whether to proceed with the snapshot based on an estimate of how long the snapshot would take to complete. Alternatively or in addition, the storage controller logic 160 may make the determination of whether the snapshot is to proceed based on the estimate. The storage controller logic 160 may subsequently notify the storage volume consumer 140 or the snapshot volume consumer 150 of the determination made by the storage controller logic 160 of whether to proceed or abort the snapshot.

After copying all of the data blocks (430), the storage controller logic 160 may temporarily cease accepting new write requests to the storage volume 175 (440). Then, the storage controller logic 160 may determine whether there are any dirty regions of the first memory cache 170 (450).

If there are any dirty regions, the storage controller logic 160 may copy the data in the dirty regions of the first memory cache 170 to the second memory cache 180 until no dirty regions remain to be copied (460). If there are not any dirty regions or the storage controller logic 160 has finished copying the data in the dirty regions, the storage controller logic 160 may resume accepting write requests for the storage volume 175 (470). At this point, the snapshot is complete and the operation may end by, for example, the storage controller logic 160 providing block-level access to the storage volume 185.

In one example, the contents of the snapshot volume 185 may be optionally copied to one or more backing stores 130. Alternatively, the contents of the snapshot volume 185 may not be copied to one or more backing stores 130

When ceasing to accept writes (440), the storage controller logic 160 may reject write requests with a busy status. Alternatively or in addition, when ceasing to accept writes (440), the storage controller logic 160 may delay execution until after all dirty regions in the first memory cache 170 are copied to the second memory cache 180.

One example algorithm to track dirty regions of the storage volume 175 is to use one or more adjustable region descriptors. An adjustable region descriptor identifies one or more ranges of data blocks, where the ranges of data blocks may be modified. For example, the adjustable region descriptors may include a starting memory address and an ending address. Alternatively or in addition, the adjustable region descriptors may include a starting address and a length or size of the adjustable region. When a data block is written to a memory location adjacent to an adjustable region descriptor, the storage controller logic 160 may adjust the region descriptor to include the block. An adjusted region descriptor is the adjustable region descriptor that has been adjusted. In one example, instead of clearing a dirty flag (360) to indicate that the contents of the region have been copied to the second memory cache 180, the storage controller logic 160 disposes of the region descriptors for the copied data.

4. Copy-on-Write Example

Figure 5:
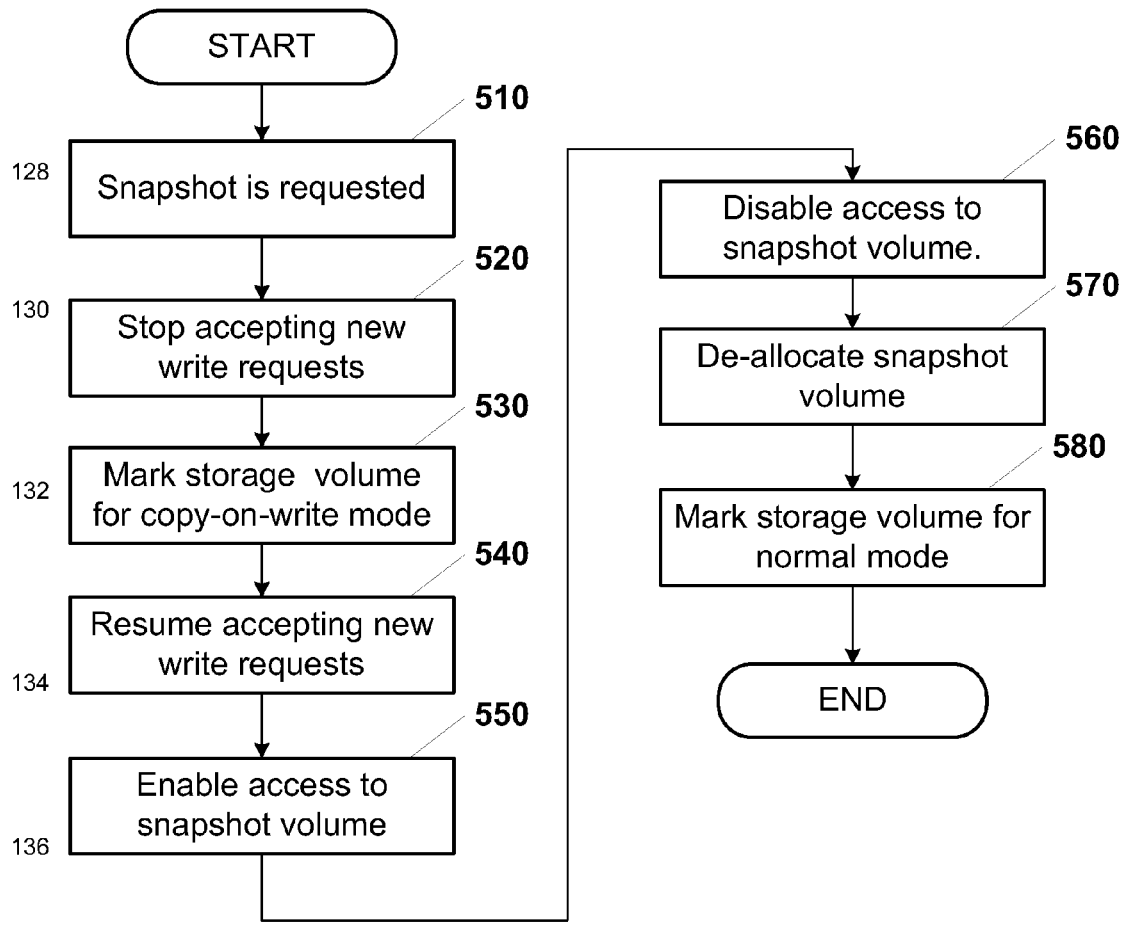
FIG. 5 illustrates a fourth example flow diagram of the logic of the storage system to form a snapshot using a copy-on-write mode.

FIG. 5 illustrates a fourth example flow diagram of the logic of the storage system 100 to form a snapshot using a copy-on-write mode. The logic may include additional, different, or fewer operations. The operations may be executed in a different order than illustrated in FIG. 5.

In the copy-on-write example, the storage system 100 uses two mappings corresponding to the storage volume 175 and the snapshot volume, respectively. Each of the mappings may map data blocks in the volume to memory locations in the memory 110. Thus, block-level access to the volumes is provided through the two mappings. The mappings initially may map to the same memory locations. If a data block is updated as a result of a write request after the snapshot is requested, then the data block subject to the write request is copied to a new memory location before being overwritten. The mapping corresponding to the snapshot volume 185 is updated to point to the new memory location so that the snapshot volume 185 will continue to include the original value. Alternatively or in addition, if a data block is updated as a result of a write request after the snapshot is requested, then the write request may proceed using a new memory location. The mapping corresponding to the storage volume 175 is updated to point to the new memory location so that the snapshot volume 185 will continue to include the original value.

The mappings may be implemented as lookup tables, or using a virtual memory system. The mappings provide a translation between a region of the corresponding volume and a memory location in the memory 110. Accordingly, the first memory cache 170 and the second memory cache 180 may initially overlap.

In the copy-on-write example, the memory 110 does not need to be any larger than the sum of the size of the storage volume 175 and the size of scratch space. The scratch space is used to allocate new memory locations as a result of write requests processed while the snapshot is accessible. The amount of scratch space to leave available in the memory 110 may be determined based upon an expected write load experienced by the storage volume 175, or some other metric.

The storage controller logic 160 processes read and write requests for the storage volume 175 by reading from and writing to the first memory cache 170 as determined by a first one of the two mappings, referred to hereafter as a storage volume mapping. The storage controller logic 160 may create or maintain the second one of the two mappings for the snapshot volume 185 as an exact copy of the first one of the two mappings, referred to hereafter as a snapshot volume mapping. Alternatively or in addition, the snapshot volume mapping may comprise a set of differences from the storage volume mapping or the storage volume mapping may comprise a set of differences from the snapshot volume mapping. In one example, the snapshot volume mapping may include a pre-allocated set of memory locations to be used as a result of write requests processed while the snapshot is accessible and may selectively map each pre-allocated memory location as needed. In another example, the storage volume mapping may include a pre-allocated set of memory locations to be used as a result of write requests processed while the snapshot is accessible and may selectively map each pre-allocated memory location as needed.

The operation may begin by the storage controller logic 160 receiving a request for the snapshot (510). The storage controller logic 160 may temporarily cease to accept new write requests for the storage volume 170 (520). Alternatively or in addition, the storage controller logic 160 may create the snapshot volume mapping from the storage volume mapping.

The storage controller logic 160 may mark the storage volume 175 for copy-on-write mode (530). The storage controller logic 160 may then resume accepting write requests for the storage volume 175 (540). In one example, the storage controller logic 160 may provide block-level access to the snapshot volume 175 (550). In a second example, the storage controller logic 160 may not provide access to the snapshot volume 175.

While the storage controller logic 160 provides block-level access to the snapshot volume 175, the snapshot may optionally be used for some purpose. For example, the contents of the snapshot volume 185 may be copied to one or more backing stores 130. Alternatively or in addition, the storage controller logic 160 may receive an instruction from the storage volume consumer 140 to restore the storage volume 175 from the snapshot volume 185. In response, the storage controller logic 160 may set the storage volume mapping to be equal to the snapshot volume mapping. The regions of the memory 110 that were non-overlapping may be deallocated.

If the snapshot volume 185 is no longer needed or desired, the storage controller logic 160 may disable access to the snapshot volume 185 if previously made accessible (560). The storage controller logic 160 may de-allocate regions of the memory 110 that are mapped to the snapshot volume 185 (570). Alternatively or in addition, the storage controller logic 160 may set the snapshot volume mapping to be equal to the storage volume mapping. The storage controller logic 160 may mark the storage volume 175 for normal mode instead of the copy-on-write mode.

When ceasing to accept writes (520), the storage controller logic 160 may reject write requests with a busy status. Alternatively or in addition, when ceasing to accept writes (520), the storage controller logic 160 may delay execution until after marking the storage volume 175 for copy-on-write mode (530).

While in copy-on-write mode (132), writes to the storage volume 175 are handled differently depending on whether the volume mappings point to the same memory locations for the particular blocks identified in the write request. For portions of the write request where the storage volume mapping and the snapshot volume mapping point to overlapping regions of the memory 110, the overlapping regions may be separated using copy-on-write, copy-before-write, or other techniques. For portions of the write request where the storage volume mapping and the snapshot volume mapping point to non-overlapping regions of the memory 110, the blocks identified in the write request may be written to the regions of the memory 110 referred to in the storage volume mapping.

Alternatively, portions of the write request where the storage volume mapping and the snapshot volume mapping point to overlapping regions of the memory 110, the overlapping regions may be separated using copy-on-write, copy-before-write, or other techniques. For portions of the write request where the storage volume mapping and the snapshot volume mapping point to non-overlapping regions of the memory 110, the blocks identified in the write request may be written to the regions of the memory 110 referred to in the snapshot volume mapping.

Reads from the storage volume are handled by accessing regions in the memory 110 referred to by the storage volume mapping. Reads from the snapshot volume 185 are handled by accessing regions of the memory 110 referred to by the snapshot volume mapping.

5. Additional Examples

The systems and methods for performing rapid data snapshots may be implemented in a storage strategy that maximizes protection of data in extreme, mission critical contexts, including data having properties of transactional integrity, urgency, transience, and volatility, thereby benefiting from the fastest possible commit and recovery speeds. In one example, rapid snapshots may be considered to provide data protection occurring at memory-to-memory copy speed performance but with natural persistence properties providing for integrity and recoverability of data. In a second example, the storage system 100 may be considered a single block device able to make a snapshot of a volume in the block device without copying the volume over a block storage device interface.

The systems and methods for performing rapid data snapshots may provide data integrity and rapid recoverability to multiple storage media concurrently and/or in parallel. Thus, a scalable, systematic strategy for protecting and recovering data at the largest possible scales, and at theoretical performance thresholds of the fastest mechanisms available is provided.

Beyond single systems, the rapid snapshot techniques described herein apply to any number of related storage media. For example, integrating the storage system 100 with a file system or database that is using the storage system 100 may result in a system capable of more flexible and efficient snapshots. For example, by monitoring file system-level activity, the system may identify when coherent updates have been made to files or directories in the file system, thereby enabling the system to make more intelligent decisions about when to trigger a snapshot or what data to duplicate. Alternatively or in addition, the system may decide to duplicate and/or exclude updates to specific files and/or directories, all new files, files owned by a specific set of users, or some combination thereof. Similarly, by monitoring database activity, the system may identify when database transactions are completed, thereby enabling the system to make more intelligent decisions about when to trigger a snapshot or what data to duplicate. Alternatively or in addition, the system may make a decision to duplicate and/or exclude all updates to specific tables, records, and/or attributes, to duplicate all transactions performed by a specific set of users, or any combination thereof.

In a first example, the storage system 100 may make further optimizations by not duplicating some or all of the areas of the storage volume 175 known not to be in use in response to information provided about block usage. Information about block usage may be obtained by, for example, the ATA Interface TRIM command, other cross-layer information sharing technique, integration of a file system or database with the storage system 100, or any other suitable technique. These optimizations may further reduce the time required to perform a snapshot to a degree proportionate to the percentage of the storage volume 175 that is identified as not in use.

In a second example, the storage system 100 may create a snapshot of the storage volume 175 in multiple snapshot volumes, providing multiple, identical duplicates of the storage volume 175. For example, storage system 100 may perform multiple concurrent snapshot operations, each using the same storage volume as the source of data; perform multiple snapshot operations in rapid succession, where a previously written snapshot volume is used as the source of data for a new snapshot volume; or any combination thereof. Alternatively or in addition, the storage system 100 may create a snapshot of one storage volume by copying the storage volume into multiple snapshot volumes in rapid succession, each of the multiple snapshot volumes providing copies of the storage volume at a different point in time.

When using the copy-on-write example, the storage system 100 does not necessarily need to allocate enough of the memory 110 to hold a full copy of a snapshot volume 185. Therefore, multiple snapshots of the same storage volume 175 representing different points in time may be stored in the memory 110, even when a corresponding number of complete copies would take more memory than is available in the storage system 100. The increased over-subscription may be accommodated by enabling multiple snapshot volumes to share overlapping regions of the memory 110 with each other and/or with the storage volume 175. As changes are made to the storage volume 175, overlapping regions may be separated between the written-to storage volume 175 and the corresponding snapshot volume(s) that share these regions. If, through increased cache region separations or other system activity, more memory is needed to hold the various volumes than is available, the storage system 100 may discard one or more volumes based upon policies configured in the storage system 100 or specified by the storage volume consumer 140 and/or the snapshot volume consumer 150.

In another example, the storage system 100 may perform multiple independent snapshot operations concurrently. Available system bandwidth may be split among the snapshot operations, but the concurrency gained may be valuable if coordinated or coincident snapshots of multiple volumes are desired.

In yet another example, the storage system 100 may comprise a plurality of systems that communicate among each other and/or with a central coordinator or client to synchronize backup operations performed in each respective one of the systems. The perceived duration of a backup operation performed on such a cluster may be no longer than the maximum round-trip communication delay plus a negligible time spent performing the instant backup. For example, the systems may each be treated as a block device, but exposed as one logical volume. A snapshot of the logical volume may be created by instructing each of the block devices to make a snapshot of their respective storage volume 175. When coupled with peer-to-peer networking or implemented using distributed hash tables, this technique could scale to support petabyte (1,024 terabytes) backups in a fraction of a second.

In still another example, the storage system 100 may be organized to operate as a collection of sub-systems, where each sub-system is responsible for a portion of the snapshot method(s) being used. For example, the storage system 100 may include multiple motherboards within a single system chassis, multiple motherboards in multiple chassis, or a heterogeneous combination of these. The memory 110 used to hold storage volumes and snapshot volumes may be distributed across multiple subsystems in various ways. For example, the first memory cache 170 may be located in one sub-system, while the corresponding second memory cache 180 may be located in one or more other sub-systems. When sub-systems are installed in different geographic locations, or are associated with different clients, the storage system 100 may be used to perform rapid data migration, such as a migration of a virtual machine from one compute node to another. Similarly, the cache allocated to each volume may be spread and/or duplicated across multiple such sub-systems to provide increased data protection through redundancy and/or dispersion, or increased application performance through multiple points of access. Such spreading/duplication may be accomplished using error-correcting codes, such as used in RAID (redundant array of inexpensive disks) systems.

The storage system 100 may be implemented in many different ways. For example, although some features are shown stored in computer-readable memories (e.g., as logic implemented as computer-executable instructions or as data structures in memory), all or part of the system and its logic and data structures may be stored on, distributed across, or read from other machine-readable media. The media may include hard disks, floppy disks, CD-ROMs, a signal, such as a signal received from a network or received over multiple packets communicated across the network.

The processing capability of the storage system 100 may be distributed among multiple entities, such as among multiple processors and memories, optionally including multiple distributed processing systems. Parameters, databases, and other data structures may be separately stored and managed, may be incorporated into a single memory or database, may be logically and physically organized in many different ways, and may implemented with different types of data structures such as linked lists, hash tables, or implicit storage mechanisms. Logic, such as programs or circuitry, may be combined or split among multiple programs, distributed across several memories and processors, and may be implemented in a library, such as a shared library (for example, a dynamic link library (DLL)).

All of the discussion, regardless of the particular implementation described, is exemplary in nature, rather than limiting. For example, although selected aspects, features, or components of the implementations are depicted as being stored in memories, all or part of systems and methods consistent with the innovations may be stored on, distributed across, or read from other computer-readable media, for example, secondary storage devices such as hard disks, floppy disks, and CD-ROMs; a signal received from a network; or other forms of ROM or RAM either currently known or later developed. Moreover, the various modules and screen display functionality is but one example of such functionality and any other configurations encompassing similar functionality are possible.

Furthermore, although specific components of innovations were described, methods, systems, and articles of manufacture consistent with the innovation may include additional or different components. For example, a processor may be implemented as a microprocessor, microcontroller, application specific integrated circuit (ASIC), discrete logic, or a combination of other type of circuits or logic. Similarly, memories may be DRAM, SRAM, Flash or any other type of memory. Flags, data, databases, tables, entities, and other data structures may be separately stored and managed, may be incorporated into a single memory or database, may be distributed, or may be logically and physically organized in many different ways. Programs may be parts of a single program, separate programs, or distributed across several memories and processors.

The respective logic, software or instructions for implementing the processes, methods and/or techniques discussed above may be provided on computer-readable media or memories or other tangible media, such as a cache, buffer, RAM, removable media, hard drive, other computer readable storage media, or any other tangible media or any combination thereof. The tangible media include various types of volatile and nonvolatile storage media. The functions, acts or tasks illustrated in the figures or described herein may be executed in response to one or more sets of logic or instructions stored in or on computer readable media. The functions, acts or tasks are independent of the particular type of instructions set, storage media, processor or processing strategy and may be performed by software, hardware, integrated circuits, firmware, micro code and the like, operating alone or in combination. Likewise, processing strategies may include multiprocessing, multitasking, parallel processing and the like. In one embodiment, the instructions are stored on a removable media device for reading by local or remote systems. In other embodiments, the logic or instructions are stored in a remote location for transfer through a computer network or over telephone lines. In yet other embodiments, the logic or instructions are stored within a given computer, central processing unit ("CPU"), graphics processing unit ("GPU"), or system.

While various embodiments of the innovation have been described, it will be apparent to those of ordinary skill in the art that many more embodiments and implementations are possible within the scope of the innovation. Accordingly, the innovation is not to be restricted except in light of the attached claims and their equivalents.

What is claimed is:

1. A storage system to form at least one snapshot of at least one storage volume comprising:
  a storage hardware interface;
  a memory; and
  at least one processor in communication with the memory and the storage hardware interface, the memory comprising:
    a first solid state memory cache;
    a second solid state memory cache, the first and second solid state memory caches being addressable with the at least one processor in a common address space; and
    storage controller logic executable with the at least one processor to:
      provide block-level access to the at least one storage volume over the storage hardware interface;
      store all data blocks of the at least one storage volume in the first solid state memory cache; and
      form the at least one snapshot of the at least one storage volume, all data blocks of the at least one snapshot being stored in the second solid state memory cache.

2. The storage system of claim 1, wherein the storage controller logic executable to form the at least one snapshot is further executable to copy all data blocks of the at least one storage volume from the first solid-state memory cache to the second solid-state memory cache.

3. The storage system of claim 2, wherein the storage controller logic is executable with the at least one processor to:

track dirty blocks written to the at least one storage volume during a time period in which all data blocks of the at least one storage volume are copied to the second solid-state memory cache;

stop acceptance of write requests, the write requests being for the at least one storage volume;

copy the dirty blocks to the second solid-state memory cache; and resume the acceptance of write requests after the dirty blocks are copied.

4. The storage system of claim 3, wherein the storage controller logic is executable with the at least one processor to track the dirty blocks based on adjusted region descriptors.

5. The storage system of claim 1, further comprising a memory controller and a system bus, wherein the at least one processor and the memory controller are coupled to the system bus, the memory controller is coupled to the memory, and the at least one processor is in communication with the memory through the memory controller.

6. The storage system of claim 1, further comprising a single block storage device, the single block storage device comprising the memory, the at least one processor, and the storage hardware interface.

7. The storage system of claim 1, wherein the storage controller logic is executable with the at least one processor to provide the block-level access in accordance with a storage protocol.

8. A tangible computer-readable storage medium encoded with computer executable instructions, the computer executable instructions executable with at least one processor, the computer-readable medium comprising instructions executable to provide block-level access to a storage volume over a storage hardware interface in accordance with a storage protocol, the instructions executable to provide the block-level access including:

instructions executable to provide the storage volume in a first memory cache, the first memory cache comprising all data stored in the storage volume; and instructions executable to form a snapshot of the storage volume in a second memory cache, the second memory cache comprising all data stored in the snapshot of the storage volume, the first and second memory caches being addressable by the at least one processor.

9. The tangible computer-readable storage medium of claim 8, wherein the instructions executable to form the snapshot of the storage volume further comprise:

instructions executable to determine a first memory location at which at least one block of the storage volume is stored in the first memory cache;

instructions executable to determine a second memory location at which at least one block of the snapshot is stored in the second memory cache, the at least one block of the snapshot corresponding to the at least one block of the storage volume; and instructions executable to perform a memory copy command, the memory copy command executable with the at least one processor to copy data stored at the first memory location to the second memory location.

10. The tangible computer-readable storage medium of claim 8, wherein the instructions executable to form the snapshot of the storage volume further comprise:

instructions executable to reject write requests received after the snapshot of the storage volume is initiated but before the snapshot of the storage volume is complete; and instructions executable to resume acceptance of write requests received after the snapshot of the storage volume is complete.

11. The tangible computer-readable storage medium of claim 8, wherein the instructions executable to form the snapshot of the storage volume further comprise:

instructions executable to delay writes to the storage volume requested in write requests received after the snapshot of the storage volume is initiated; and instructions executable to perform the writes after the snapshot of the storage volume is complete.

12. The tangible computer-readable storage medium of claim 8, wherein the storage volume is a configured area of storage accessible at the block level via a storage protocol.

13. The tangible computer-readable storage medium of claim 8, wherein the at least one processor is configured to address the first and second memory cache caches over a system bus.

14. The tangible computer-readable storage medium of claim 8, wherein the instructions executable to form the snapshot of the storage volume further comprise instructions executable to provide block-level access to a snapshot volume, wherein all data blocks of the snapshot volume are mapped to the snapshot of the storage volume.

15. A computer-implemented method to form a snapshot volume from a storage volume, the method comprising:

providing block-level access to the storage volume over a storage hardware interface in accordance with a storage protocol;

providing the storage volume in a first memory cache, the first memory cache comprising all data of the storage volume;

initiating the snapshot of the storage volume with the at least one processor; and copying at least a portion of the data of the storage volume from the first memory cache to a second memory cache with the at least one processor, the second memory cache comprising all data of the snapshot volume, the first and second memory caches being addressable by the at least one processor over a system bus.

16. The computer-implemented method of claim 15, further comprising copying all data blocks of the snapshot volume, after the snapshot of the storage volume is complete, from the second memory cache to a storage medium having a slower write rate than the memory, the memory being solid state memory.

17. The computer-implemented method of claim 15, wherein copying the at least a portion of the data of the storage volume comprises copying all data blocks of the storage volume from the first memory cache to the second memory cache in response to initiation of the snapshot of the storage volume.

18. The computer-implemented method of claim 17, further comprising, with the at least one processor:

tracking any updated data blocks in the first memory cache updated during the copying of all data blocks of the storage volume from the first memory cache to the second memory cache;

ceasing to accept new write requests to the storage volume after all data blocks of the storage volume are copied;

copying any updated data blocks from the first memory cache to the second memory cache; and resuming acceptance of new write requests after the updated data blocks are copied.

19. The computer-implemented method of claim 15, further comprising:

receiving, with the at least one processor, a plurality of requests to write updated data blocks to the storage volume;

writing the updated data blocks with the at least one processor to the first memory cache in response to the requests;

indicating at least one memory region of the first memory cache that includes the updated data blocks is dirty by setting at least one dirty flag;

copying data blocks included in the at least one memory region from the first memory cache to the second memory cache and clearing the at least one dirty flag;

ceasing to accept new write requests to the storage volume in response to initiation of the snapshot of the storage volume if any of the at least one dirty flag is not yet cleared; and resuming acceptance of new write requests with the at least one processor after all remaining data blocks in the at least one memory region are copied from the first memory cache to the second memory cache, the at least a portion of the data of the storage volume including the all remaining data blocks.

20. The computer-implemented method of claim 15, wherein copying the at least a portion of the data blocks of the storage volume from the first memory cache to the second memory cache comprises copying data blocks of the storage volume subject to a write request received after the snapshot of the storage volume is initiated, the second memory cache overlapping the first memory cache except for a portion of the second memory cache in which the at least a portion of the data blocks of the storage volume are stored.

21. A computer-implemented method to form a snapshot volume from a storage volume, the method comprising:

storing the storage volume in a first memory cache with at least one processor, the first memory cache comprising all data of the storage volume, the storage volume being included in one storage device;

initiating the snapshot of the storage volume with the at least one processor; and copying at least a portion of the data of the storage volume from the first memory cache to a second memory cache with the at least one processor, the second memory cache comprising all data of the snapshot volume, the first and second memory caches included in one area of memory in the one storage device.

* * * * *